United States Patent [19]
Meckstroth

[11] Patent Number: 5,873,799
[45] Date of Patent: Feb. 23, 1999

[54] SPEED RESPONSIVE LOCKING DRIVE BELT TENSIONER FOR AN AUTOMOTIVE ENGINE

[75] Inventor: Richard John Meckstroth, Northville, Mich.

[73] Assignee: Ford Global Technologies, Inc., Dearborn, Mich.

[21] Appl. No.: 901,517

[22] Filed: Jul. 28, 1997

[51] Int. Cl.⁶ ................................................. F16H 7/12
[52] U.S. Cl. ........................... 474/135; 474/101; 474/133
[58] Field of Search .................................. 474/135, 69, 70, 474/71, 73, 74, 77, 78, 101, 109, 110, 111, 119, 121, 124, 14

[56] References Cited

U.S. PATENT DOCUMENTS

| | | |
|---|---|---|
| 3,012,445 | 12/1961 | Becker et al. .......................... 474/74 X |
| 4,557,709 | 12/1985 | St. John ................................ 474/135 X |
| 4,822,322 | 4/1989 | Martin ...................................... 474/135 |
| 4,906,222 | 3/1990 | Henderson ............................... 474/135 |
| 4,934,988 | 6/1990 | Kawamura et al. ................. 474/135 X |
| 5,597,060 | 1/1997 | Huddleston et al. .................. 474/14 X |

Primary Examiner—Rodney H. Bonck
Assistant Examiner—Marcus Charles
Attorney, Agent, or Firm—Jerome R. Drouillard

[57] ABSTRACT

An accessory belt tensioner of an automotive engine includes a hub adapted to be fixed to an engine, an arm journaled upon the hub, a tensioner pulley mounted upon the arm, and a torsion spring interposed between the arm and hub. An antirotation lock incorporated within the arm and pulley locks the arm to the hub whenever the rotational speed of the pulley exceeds a predetermined threshold.

10 Claims, 2 Drawing Sheets

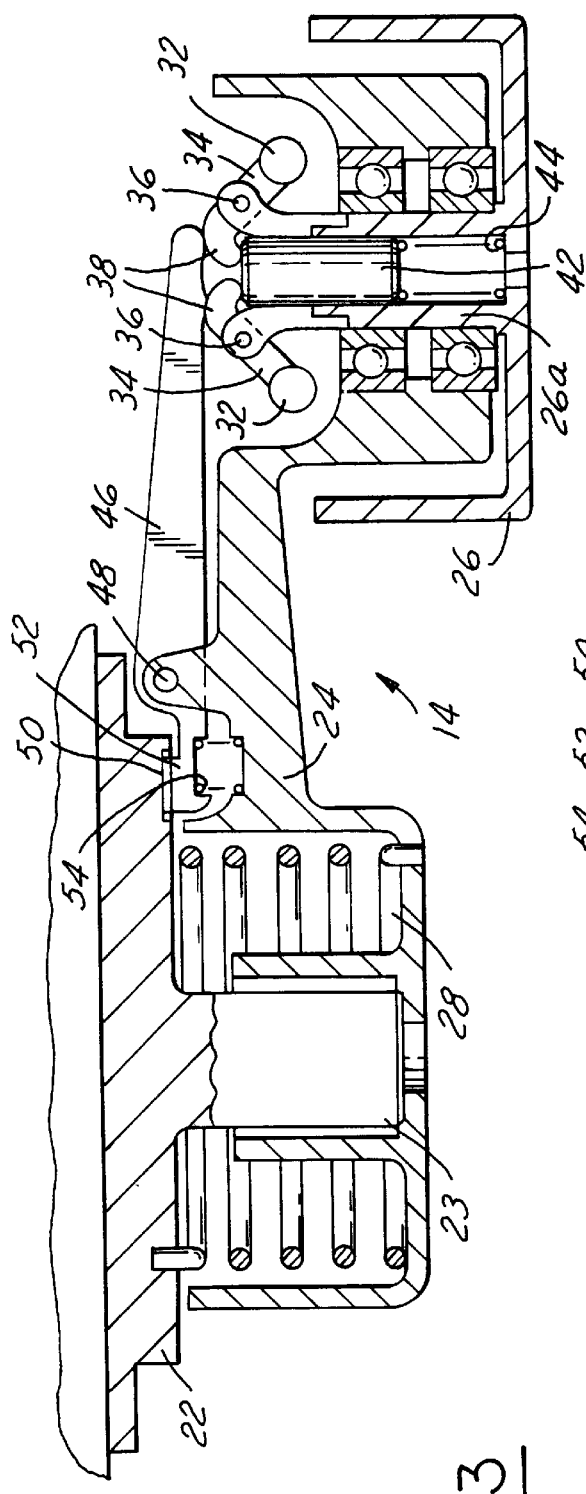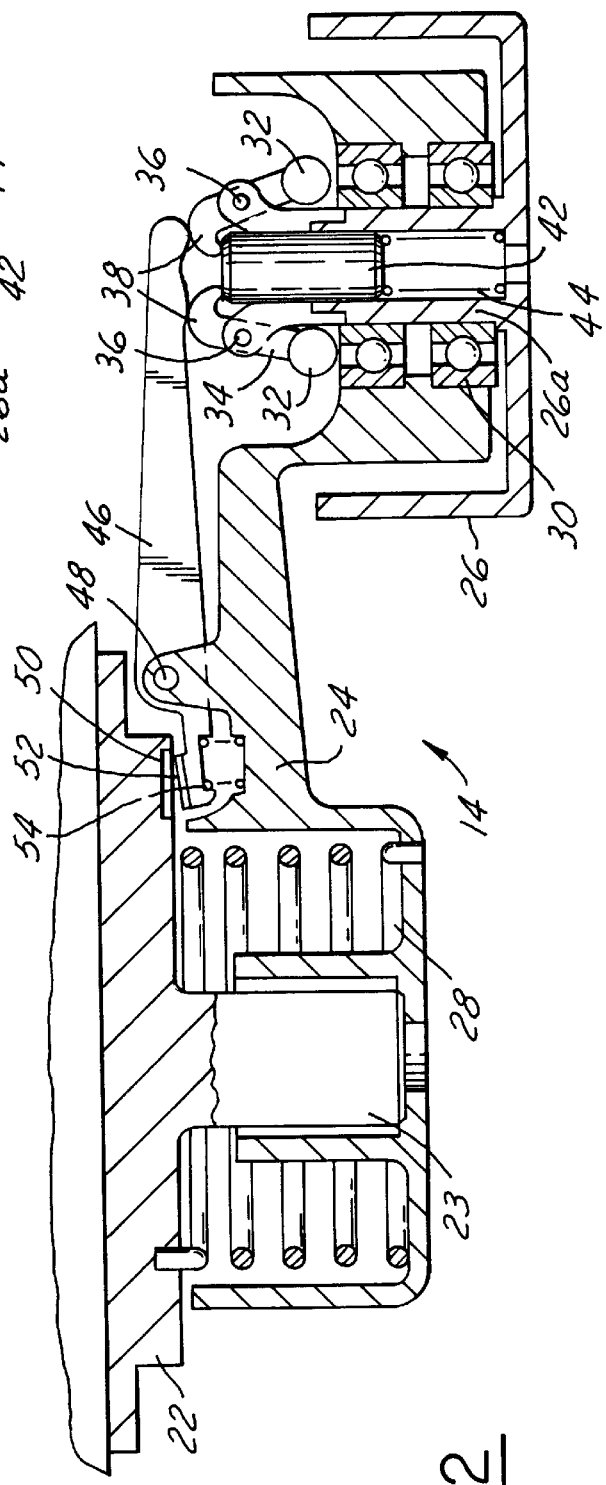

SPEED RESPONSIVE LOCKING DRIVE BELT TENSIONER FOR AN AUTOMOTIVE ENGINE

BACKGROUND OF THE INVENTION

1. Technical Field

The present invention relates to a device for selectively eliminating resilience incorporated within a front end accessory drive belt tensioning system for an automotive engine.

2. Background Information

Front end accessory drives incorporated in modern automotive engines are called upon to power a number of accessories such as an air conditioning compressor, alternator, power steering pump, water pump, air injection pump, and other devices. Problems have arisen with front end accessory drives because certain accessories, such as engine cooling fans or alternators, have considerable rotational inertia. This may cause objectionable belt noise during certain operating modes of the engine. For example, during the one-two upshift of an automatic transmission, the engine will decelerate at an exceedingly rapid rate. As a result, the inertia of the alternator may cause the alternator to actually become a driving portion of the system instead of the engine's crankshaft during the wide-open throttle upshift. This overdrive condition caused by inertia of the alternator or engine driven cooling fan, may cause a slack portion or "bubble" to develop in the accessory drive belt, thereby causing a squeal. Unfortunately, motorists may incorrectly identify the squeal with defective parts and as a result seek expensive albeit unneeded warranty repairs.

In particularly severe cases, the bubble phenomenon may result in the belt jumping off one of more of the pulleys, and this may lead to a very expensive repair, without remedying anything. A tensioner according to the present invention avoids the problem of undesirable slack developing in a drive belt with a simple mechanical device divorced from the engine control system.

SUMMARY OF THE INVENTION

An accessory belt tensioner for an automotive engine includes a hub adapted to be fixed to an engine, an arm journaled upon the hub, a tensioner pulley mounted upon the arm, and a torsion spring interposed between the arm and the hub, with the torsion spring serving to resiliently bias the arm and tensioner pulley into contact with an accessory drive belt. An antirotation lock incorporated within the arm and pulley and powered by the drive belt itself, locks the arm to the hub whenever the rotational speed of the pulley exceeds a predetermined threshold.

An antirotation lock according to the present invention preferably comprises a speed responsive element mounted for rotation with the pulley, with the speed responsive element actuating a clutch housed in the arm, and with the clutch having a locking element adapted for selective interposition between the arm and the hub. The speed responsive element may comprise a flyweight or pair of flyweights driven by the pulley. The flyweights are each mounted on a separate pivoting control arm driven by the pulley, with each control arm having a cam portion operatively engaged with a clutch operating lever such that centrifugal force acting upon the flyweights will cause rotation of the control arm and cam, thereby releasing the operating lever so as to cause the locking element of the clutch to engage the hub in response to rotational speed of the pulley in excess of a predetermined threshold. The operating lever is normally biased in a direction in which the dog is disengaged from the hub notches.

It is an advantage of the present invention that belt squeal of an automotive accessory drive belt may be controlled without the need for costly hydraulically operated or electronically operated mechanisms.

Other objects, features, and advantages of the present invention will become apparent to the reader of the present specification.

BRIEF DESCRIPTION OF THE DRAWINGS

FIG. 2 is a sectional view, partially broken away, of a tensioner according to the present invention in an unlocked position, taken along the line 2—2 of FIG. 1.

FIG. 3 is similar to FIG. 2, but shows the tensioner of the present invention in a locked position.

DETAILED DESCRIPTION OF PREFERRED EMBODIMENTS

Figure 1:
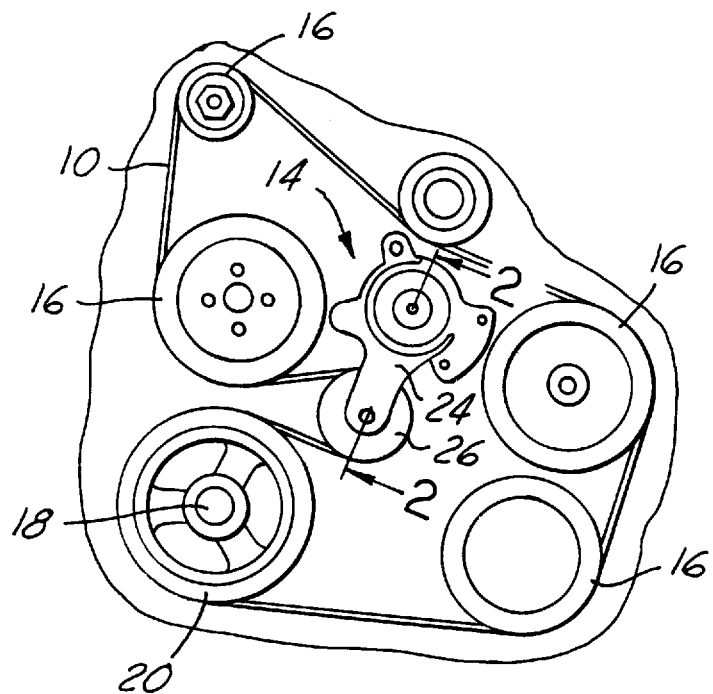
FIG. 1 is a schematic representation of an engine having a tensioner according to the present invention.

As shown in FIG. 1, automotive engine 12 having a plurality of rotating accessories 16 has drive belt 10 which is powered by engine crankshaft 18 by means of crankshaft pulley 20. Tension is maintained on drive belt 10 by means of tensioner 14 which is attached by bolts or other suitable means to engine 12.

Details of the construction of tensioner 14 are shown with particularity in FIGS. 2 and 3. Hub 22 is attached to the front of engine 12 and has center post 23 with arm 24 journaled thereto. It is seen from FIG. 1 that arm 24, being rotatably attached to hub 22, is free to rotate tensioner pulley 26 in a direction so as to maintain tension on drive belt 10. Torsion spring 28 is interposed between arm 24 and hub 22 for the purpose of maintaining tension upon drive belt 10. Unfortunately, torsion spring 28 cannot be made with a sufficient rate to both resiliently tension belt 10 and prevent a bubble or slack length from developing in the belt during periods of extreme engine deceleration.

Figure 4:
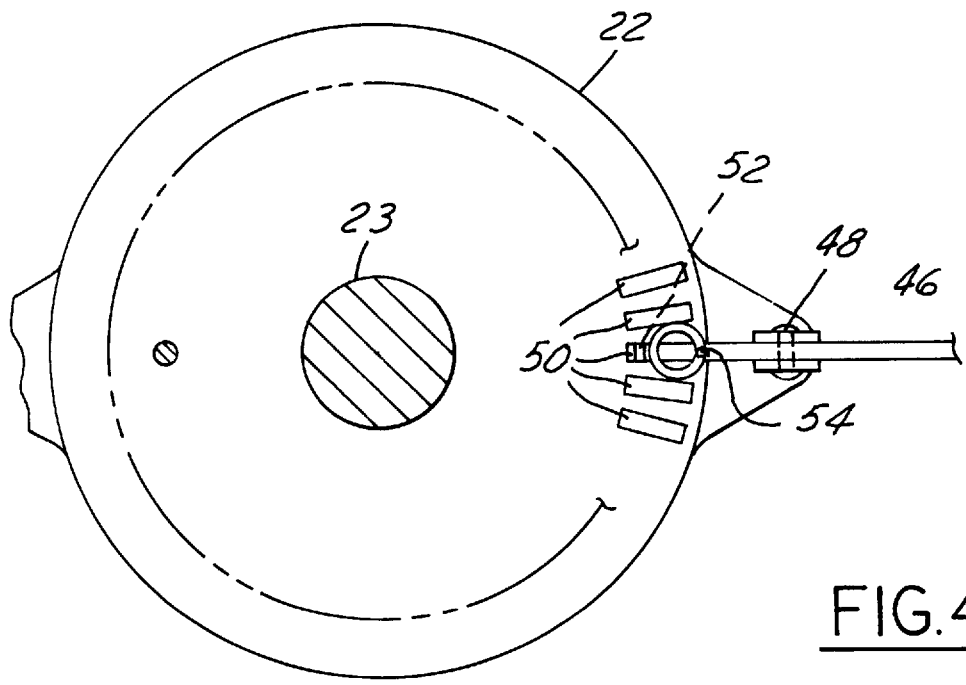
FIG. 4 illustrates some components of a locking subsystem incorporated in a tensioner according to the present invention.

A speed responsive locking feature according to the present invention is shown with particularity in FIGS. 2–4. As shown in FIG. 2, the locking mechanism is of a normally unlocked variety. That is, when the engine is at rest or at lower speeds, tensioner 14 is unlocked and operates in the fashion of a normal tensioner.

The heart of a tensioner control according to the present invention is located about pulley 26 and arm 24. Pulley 26 is mounted on bearing 30 for free rotation. Note that pulley 26 has an inner stem 26a which passes through the middle of bearing 30 and which accepts two control arms 32. Control arms 32 are pivoted by pivots 36 to stem 26a. Control arms 34 are equipped with flyweights 32 at a first end, and cams 38 at a second end. As shown in FIG. 2, plunger 42, which is loaded by means of spring 44, urges cams 38 and control arms 34 into a position in which flyweights 32 are relatively closer together, which allows cams 38 to push operating lever 46 against the force of compression spring 54, thereby disengaging locking dog 52 from locking notches 50.

FIG. 4 illustrates the positioning of locking notches 50, dog 52, operating lever 46, and pivot 48. It is thus seen that a plurality of locking notches 50 is formed in hub 22 so as to allow arm 24 to be locked in any one of a plurality of positions when dog 52 is engaged with one of notches 50.

FIG. 3 illustrates the behavior of the present system when pulley 26 is rotated at high speed by engine 12 via drive belt 10. At high engine speed, flyweights 32 move radially outward, as shown in FIG. 3, thereby causing rotation of control arms 34 and concomitant rotation of cams 38. When cams 38 are rotated to the position shown in FIG. 3, operating lever 46 is released, thereby allowing spring 54 to push operating lever 46 into its position wherein locking dog 52 is in contact with one of notches 50, thereby preventing rotation of arm 24 with respect to hub 22. In this manner, drive belt 10 will be prevented from squealing on any of the pulleys of the engine, particularly crankshaft pulley 20.

While the invention has been shown and described in its preferred embodiments, it will be clear to those skilled in the arts to which it pertains that many changes and modifications may be made thereto without departing from the scope of the invention. As but a single example, the locking element of the clutch may comprise a frictional lining, similar to that used with dry plate clutches, which may be applied to both an annular area of hub 22 which would otherwise be occupied by notches 50, and to operating lever 46, so as to replace locking notches 50 and locking dog 52.

I claim:

1. An accessory belt tensioner for an automotive engine, comprising:
   a hub adapted to be fixed to an engine;
   an arm journaled upon the hub;
   a tensioner pulley mounted upon the arm;
   a torsion spring interposed between said arm and said hub, with said spring serving to resiliently bias the arm and tensioner pulley into contact with an accessory drive belt; and
   an antirotation lock incorporated within said arm and pulley for locking said arm to said hub only when the rotational speed of the pulley with respect to the arm exceeds a predetermined threshold.

2. An accessory belt tensioner according to claim 1, wherein said antirotation lock comprises a speed responsive element mounted for rotation with said pulley with said speed responsive element actuating a clutch housed in the arm, with said clutch having a locking element adapted for selective interposition between the arm and the hub.

3. An accessory belt tensioner according to claim 2, wherein said speed responsive element comprises a flyweight driven by the pulley.

4. An accessory belt tensioner according to claim 2, wherein said speed responsive element comprises a flyweight mounted upon a pivoting control arm driven by the pulley, with said control arm having a cam portion operatively engaged with an operating lever of the clutch such that centrifugal force acting upon the flyweight will cause rotation of the control arm and cam thereby releasing the operating lever so as to cause the locking element of the clutch to engage the hub in response to rotational speed of the pulley in excess of the predetermined threshold.

5. An accessory belt tensioner for an automotive engine, comprising:
   a hub adapted to be fixed to an engine;
   an arm journaled upon the hub;
   a tensioner pulley mounted upon the arm;
   a resilient element interposed between said arm and said hub, with said element serving to bias the arm and tensioner pulley into contact with an accessory drive belt; and
   an antirotation lock powered by the engine's accessory belt, with said lock being incorporated within said arm and pulley for locking said arm to said hub whenever the rotational speed of the pulley exceeds a predetermined threshold, with said antirotation lock comprising a speed responsive element mounted for rotation with said pulley, with said speed responsive element actuating a clutch housed in the arm, with said clutch having a locking element adapted for selective interposition between the arm and the hub.

6. An accessory belt tensioner according to claim 5, wherein said speed responsive element comprises a flyweight mounted upon a pivoting control arm driven by the pulley, with said control arm having a cam portion bearing upon an operating lever of the clutch such that centrifugal force acting upon the flyweight which causes rotation of the control arm will cause the cam to release the operating lever so as to allow the locking element of the clutch to move into engagement with the hub in response to rotational speed of the pulley in excess of a predetermined threshold.

7. An accessory drive system for an automotive engine, comprising:
   a plurality of rotating accessories;
   a drive belt for powering said accessories;
   a tensioner hub fixed to a portion of the engine adjacent to said rotating accessories;
   an arm journaled upon the hub;
   a tensioner pulley mounted upon the arm;
   a resilient element interposed between said arm and said hub, with said element serving to bias the arm and tensioner pulley into contact with the accessory drive belt; and
   an antirotation lock incorporated within said arm and pulley for locking said arm to said hub whenever the rotational speed of the pulley exceeds a predetermined threshold, with said antirotation lock comprising:
   a lever operated clutch housed within the arm and having an operating lever pivoted to the arm and a dog incorporated within the operating lever for engaging a plurality of notches formed in said hub so as to prevent the arm from rotating relative to the hub; and
   at least two flyweights mounted upon pivoting control arms driven by the pulley, with each of said control arms having a cam portion resiliently biased into contact with said operating lever, with said flyweights and said control arms being responsive to centrifugal force acting upon the flyweights so that the operating lever will be released by the control arms, so as to permit the dog to engage one of said notches, when the rotational speed of the pulley, the flyweights, and the control arms exceeds the predetermined threshold.

8. An accessory drive system according to claim 7, wherein said resilient element comprises a torsion spring.

9. An accessory drive system according to claim 7, wherein said engine has a crankshaft which powers the drive belt.

10. An accessory drive system according to claim 7, wherein said operating lever is resiliently biased in a direction in which the dog is disengaged from the hub notches.

* * * * *